| United States Patent [19] | [11] Patent Number: 4,980,807 |
| Von Kohorn | [45] Date of Patent: Dec. 25, 1990 |

[54] ILLUMINATING SYSTEM

[76] Inventor: Henry Von Kohorn, 945 Treasure La., Vero Beach, Fla. 32963

[21] Appl. No.: 340,871

[22] Filed: Apr. 20, 1989

Related U.S. Application Data

[62] Division of Ser. No. 184,117, Apr. 21, 1988, Pat. No. 4,858,085.

[51] Int. Cl.⁵ .............................................. F21P 1/02
[52] U.S. Cl. .................................. 362/122; 362/290; 362/354
[58] Field of Search ............... 362/101, 154, 290, 291, 362/292, 354, 362

[56] References Cited

U.S. PATENT DOCUMENTS

| 1,974,068 | 9/1934 | Greensaft | 362/101 X |
| 2,611,856 | 9/1952 | Fredin | 362/101 |
| 4,616,304 | 10/1986 | Von Kohorn | 362/101 |

Primary Examiner—Stephen F. Husar
Attorney, Agent, or Firm—Perman & Green

[57] ABSTRACT

An illuminating system for projecting light upwardly from a light chamber without being directly visible to nearby observers. The system has a cavity disposed above the light chamber forming a vertical passageway for light. The cavity has a light blocker in the passageway for restricting the upward passage of light such that the restricted light beam passing through the cavity does not substantially impinge upon the inner surface of the cavity walls near their upper ends.

7 Claims, 4 Drawing Sheets

ILLUMINATING SYSTEM

This is a divisional of co-pending application Ser. No. 07/184,117 filed on Apr. 21, 1988, now U.S. Pat. No. 4,858,085.

The present invention relates to a glare-free illuminating system, which protects observers from a direct view of the light source and the irritation associated with such light sources as spotlights. The system is useful in area and room lighting and is particularly effective in the up-lighting of three-dimensional objects.

It is a principal object of the present invention to permit the uniform and glare-free illumination of three-dimensional objects by a light source which substantially surrounds and reaches most of the surfaces of the object to be illuminated.

It is another object of the invention to prevent even the distraction caused by the glow of light reflected by components of the lighting devices used in the system, so that the only light visible even to nearby observers is that reflected from the surfaces of the illuminated object.

Another object is the economy of power consumption and size reduction of the electric light sources resulting from a very short light path.

SUMMARY OF THE INVENTION

The system comprises a light chamber having walls which permit the light generated by the light source in said chamber to escape only in an upwardly direction. Above said light chamber are provided vertically extending hollow structures permitting the upward passage of light. Baffles or other restrictions are provided on said hollow structures which restrict the cross-section of the light beams emanating from said light source in such a way that the cross-section of the light beam emerging at the upper end of that structure is smaller than the cross section of the structure itself. In addition, the said hollow structure has inner surfaces which do not reflect light.

The said structures may have co-terminal upper ends and may be closely spaced so as to form a perforate surface on which an object to be illuminated may be placed. Light shining upwards from said light source in the direction of such an object will be divided into light beams having the cross-sectional dimensions determined by said baffle or other restrictive means. The light beams passing through said vertically extending hollow structures substantially do not impinge upon the inner wall surfaces of said structures. Such traces of light as might reach the inner surfaces of said wall are absorbed or will not be reflected by the nature of said surfaces.

As a result of the arrangement described, observers, unless they peer directly downward into the said hollow structure, are not exposed to a direct view of the light emanating from the light source and can see light only indirectly by its reflections from the surfaces of the illuminated object.

DETAILED DESCRIPTION OF THE INVENTION AND DRAWINGS

The term "non-reflective" as used herein, refers to any materials, including coatings and paints, which for practical purposes absorb sufficient light so as to reduce reflections to an insignificant amount.

The term "impermeable" or "impervious" refers to materials which essentially completely block the passage of light.

Figure 1:
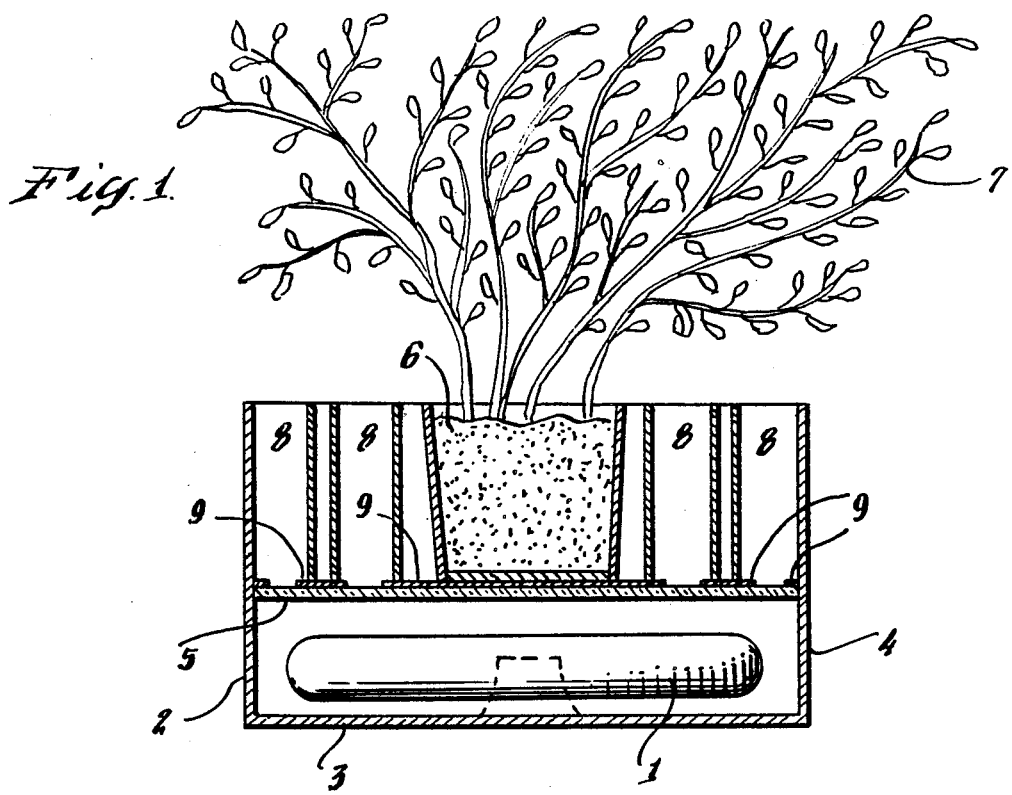
FIGS. 1–3 are diagrammatic cross-sectional views of three embodiments of the system.

FIG. 1 shows an embodiment of the system in diagrammatic cross-section. A circular fluorescent lamp 1 is mounted in light chamber 2 having bottom 3 and light-impermeable walls 4. Lamp 1 is held by a lamp holder and supplied with electricity by well known means (not shown). The upper wall of light chamber 2 comprises transparent sheet 5 which may be glass, acrylic or other transparent material and is strong enough to support the object to be illuminated, in this instance planter 6 containing a plant with foliage 7. Light chamber 2 has a square cross-section, but may have other configurations.

Above and supported by transparent sheet 5, are vertically extending hollow structures 8 which may, for example, consist of plastic tubing.

At least the upper portions of the inside surface of tubes 8, which serve as light passageways, are essentially non-light reflective. A number of light impermeable and light restrictive elements 9 are provided on the upper surface of transparent sheet 5. These restrictive elements, which act as light baffles, restrict or reduce the horizontal dimensions of the light beam passing upwardly through the passageway of tube 8 in a manner described in further detail in FIGS. 6 to 9. As a result, foliage 7, which is positioned almost directly above said passageways, will be illuminated by the reduced light beams shining upwardly through the hollow structures or tubes 8. However, the eyes of observers not positioned directly above said light passageways will be protected from direct glare and will not even be exposed to any glow or reflections of light coming from the inside wall surfaces of said tubes or structures 8, as said reduced light beams will not impinge on said surfaces. The light beams are reduced in their horizontal dimensions by the horizontal dimensions of restrictive means 9 at the lower ends of structures 8.

Restrictive means 9 may consist of layers of light impermeable material or coating. Normally the said structures 8 have light impermeable walls.

In the past, even indirect lighting has had the disadvantages of glow and reflections transmitted by the components of the recessed lighting systems, whereas the present invention does away even with such unwanted reflections.

Figure 2:
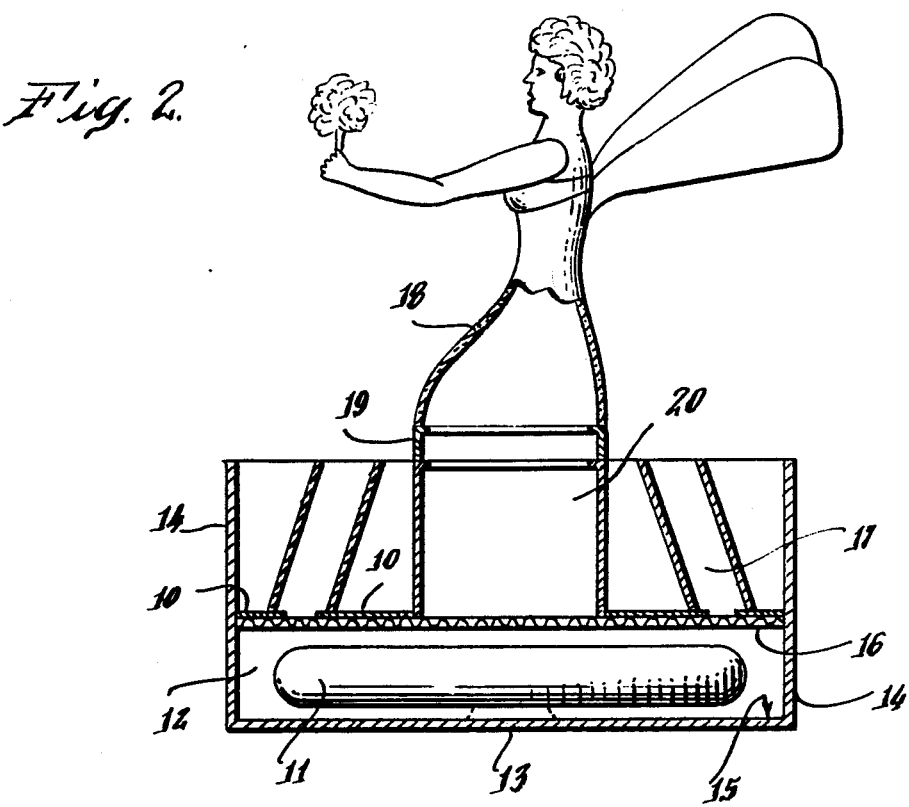

FIG. 2 is a diagrammatic cross-sectional view of another embodiment of the system. Lamp 11 is mounted in light chamber 12 having bottom 13 and light-impermeable walls 14 surrounding lamp 11 and extending above light chamber 12. Bottom 13 is light-impermeable and provided with a light reflective inner surface 15 intended to reflect light upwardly. The inside of walls 14 may also be light-reflective. Above light chamber 12 a grid or wire mesh 16 is provided as support for the hollow structures 17 and the object 18, in this instance a hollow figurine. The elongated hollow structures 17 may have a round or rectangular horizontal configuration and the upper portions of their inside surfaces are non-reflective. The tilt of structures 17 is achieved by cutting the lower ends which are in light-receiving relationship with light-chamber 12, at a slight angle.

Impermeable layers 10 restrict the width of the light beam passing through structures 17. The tubular structures 17 forming light passageways are arranged around hollow glass figurine 18 and are tilted slightly toward said object in a centripetal direction. The object to be illuminated, which in this instance is a hollow glass figurine, is mounted on a base 19 which essentially consists of a hollow frame. Said frame 19 rests on another hollow structure 20 which in turn is supported by the grid or mesh 16. Said hollow or frame structures do not substantially impair the upward passage of light from light chamber 12. Thus, the light generated by electric lamp 11 shines upwardly through grid 16, support structure 20, base 19, and illuminates the hollow transparent figurine 18 from the inside, said light at least partially shining through the glass portions of said figurine 18.

In addition to said light traveling directly upwardly to the inside of said figurine 18, light traveling upwardly through tubular structures 17 also illuminates the outside surfaces of figurine 18. Because the tubular structures 17 are provided with baffles or other light restricting means of the kind described and with non-reflective interior walls, the light projected towards object 18 is not visible to observers directly or by reflection from the lighting apparatus, but only indirectly from the illuminated object.

Figure 3:
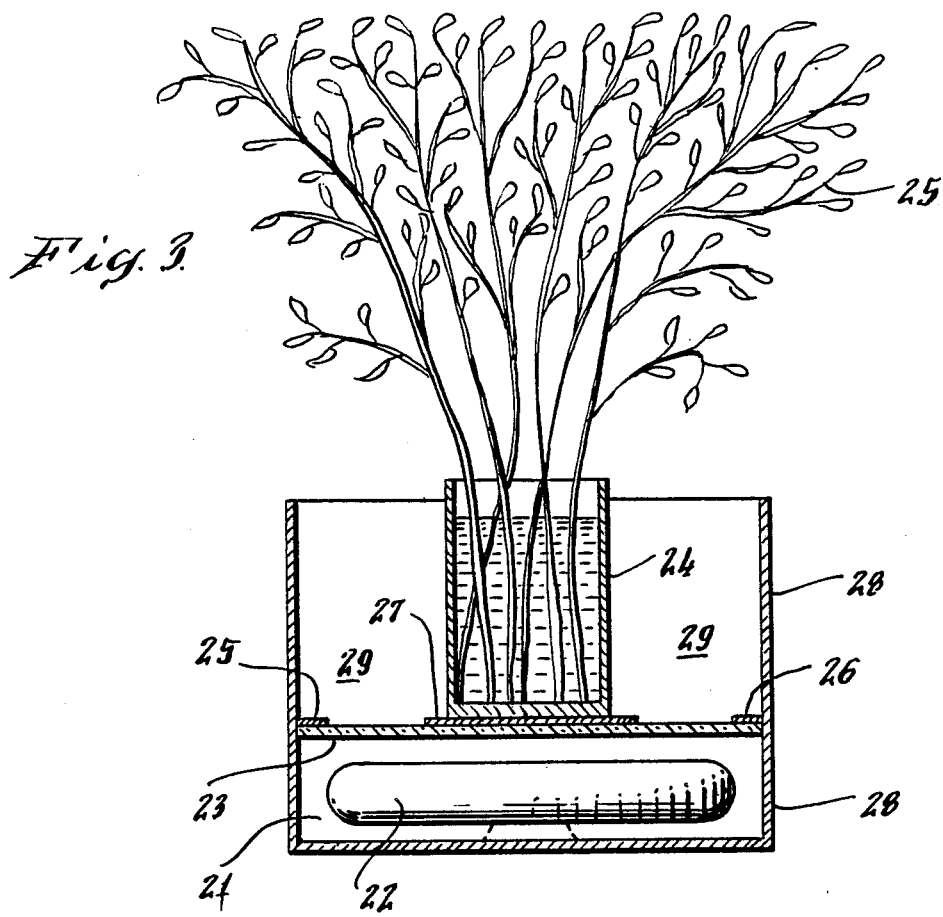

FIG. 3 depicts in diagrammatic cross-section an embodiment of a round or rectangular system comprising light chamber 21 containing lamp 22 as hereinbefore described. Light is permitted to escape only through transparent, watertight sheet 23 which forms an upper closure of light chamber 21. The waterproof cover sheet 23 supports a vase 24 containing flowers 25. Cover sheet 23 is provided with light-impermeable portions 25, 26 and 27 which light-impermeable portions may consist of a layer, such as paint or other light impenetrable substances affixed to the upper or lower surface of sheet 23.

The side walls 28 of light chamber 21 extend upwardly from and are co-extensive with the said walls of light chamber 21 and are light-impervious. Thus the upper portions of walls 28, the walls of said vase 24 and cover sheet 23 form a cavity 29, which at least partly surrounds vase 24. Light escaping upwardly from lamp 22 through the transparent portions of cover 23 passes upwardly through cavity 29 in the direction of flowers 25. Said light is restricted to the width of the beams passing between the light impervious coatings 25 and 27, or 26 and 27. The width of cavity 29 is determined by restrictions 25, 26 and 27, and is chosen so that even nearby observers cannot see the light source directly. Cavity 29 may be sub-divided, forming a plurality of cavities of different horizontal dimensions. At least the upper portions of the outside wall surfaces of vase 24 are substantially non-reflective, as are the upper portions of the inside surfaces of wall 28. As a result, observers do not see any glow or light reflections on the surfaces of the light-conductive cavity 29.

Figure 4:
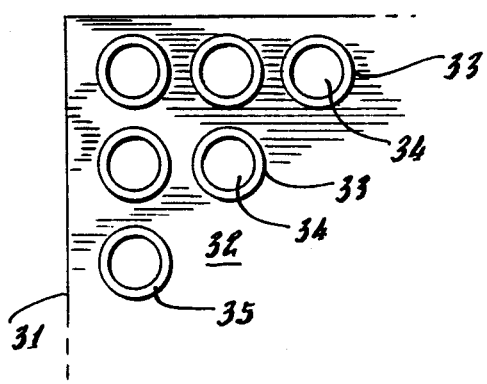
FIGS. 4 and 5 are diagrammatic cross-sectional plan views of two configurations of the hollow structures forming vertical light passageways.

FIG. 4, which is a partial, cross-sectional plan view of the system, depicts the outer boundary 31 of cover 32 of the light chamber positioned below said cover. Cover 32 is made of a light impervious material. A plurality of holes 34 are provided in cover sheet 32. Around each hole 34 have been provided tubular structures or cylinders 33 which have a diameter larger than that of holes 34. Tubular structures 33 are cemented on or otherwise fastened on cover 32. The light-restrictive annular bands 35 have a width which is half the difference in the diameters of holes 34 and cylinders 33. Light shining upwardly from the light chamber through holes 34 in cover 32 emerges from the upper ends of tubes 33 without touching the inside walls of tubes 33, the light beam passing through said tubes 33 having the diameter of holes 34. At least the upper inside portion of tubes 33 is non-reflective so that not even a glow of light is visible in said tubes 33.

Figure 5:
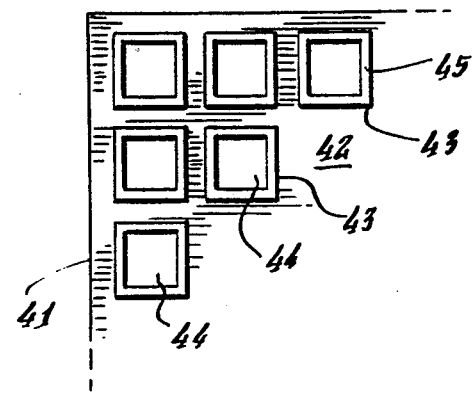

FIG. 5 which is a partial, cross-sectional plan view of the system depicts the outer boundary 41 of cover sheet 42 comprising light impervious material or coating on either the upper or lower side thereof. The hollow structures 43 having a square cross-section are fastened in an upright position to cover sheet 42. Square holes 44 are provided in sheet 42 and have smaller dimensions than structures 43, resulting in a light impervious strip 45 surrounding each hole 44 and acting as a light barrier. Light shining upwardly through holes 44 does not impinge on the inner surfaces of light impervious walls of hollow structures 43.

FIGS. 6 to 9 depict a number of different embodiments of light barriers or restrictions in the aforementioned tubular structures designed to restrict the cross-section of the light beam passing upwardly through said hollow structures. Other embodiments may be devised.

Figure 6:
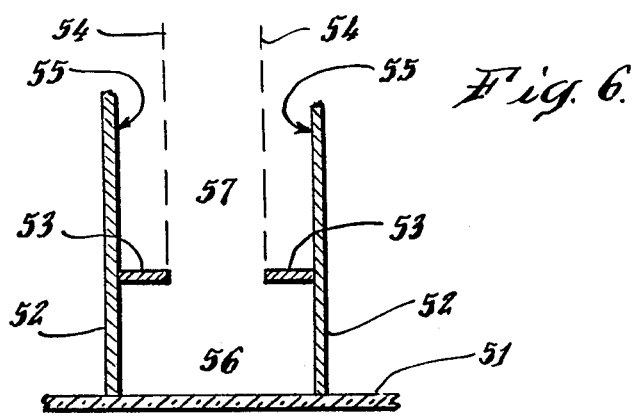
FIGS. 6–9 are diagrammatic cross-sectional views of different embodiments of restrictions in the hollow structures forming vertical light passageways.

In FIG. 6, transparent sheet 51 above the light chamber supports a hollow structure defined by walls 52. Baffles 53 are fastened to the inside of walls 52, reducing the cross-section of light beam 56 to the cross-section of light beam 57 defined by dotted lines 54. The portions 55 of the inner wall surfaces above baffles 53 are covered with a non-reflective coating, paint or other substance.

Figure 7:
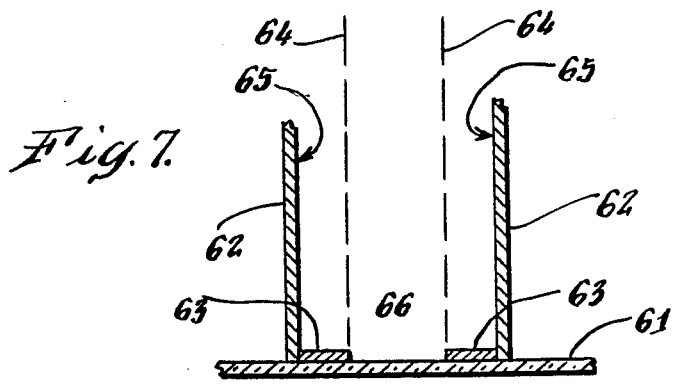

FIG. 7 depicts a transparent waterproof partition 61 positioned above the light chamber, to which is glued a hollow structure having walls 62. An annular ring 63 blocks the upward passage of light, restricting the vertical light beam 66 to the width indicated by dotted lines 64. The inside of wall surfaces 65 is non-reflective.

Figure 8:
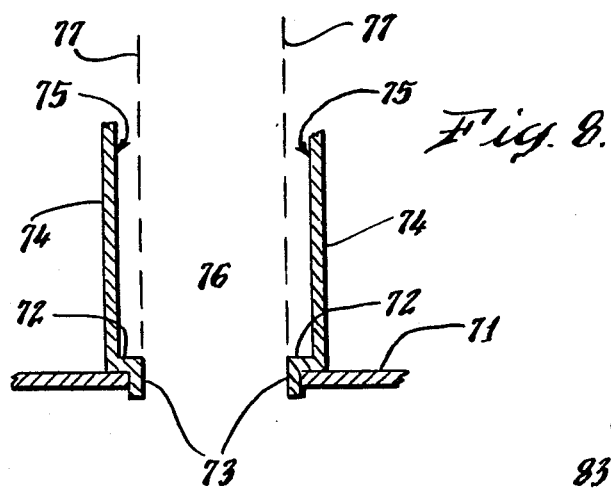

FIG. 8 depicts a perforated sheet 71 disposed above the light chamber. The perforations in sheet 71 are large enough to accommodate sleeve 73 of a tubular structure 74 connected to sleeve 73 by setback 72. The lower surfaces of setback 72 rest on the upper surface of sheet 71 which consists of light-impervious material. The inner surfaces of structure 74 are provided with a non-reflective coating 75. Light passing upwardly through sleeve 73 results in light beam 76, the diameter of which is defined by dotted lines 77. Light beam 76 does not touch the inner surfaces of structure 74.

Figure 9:
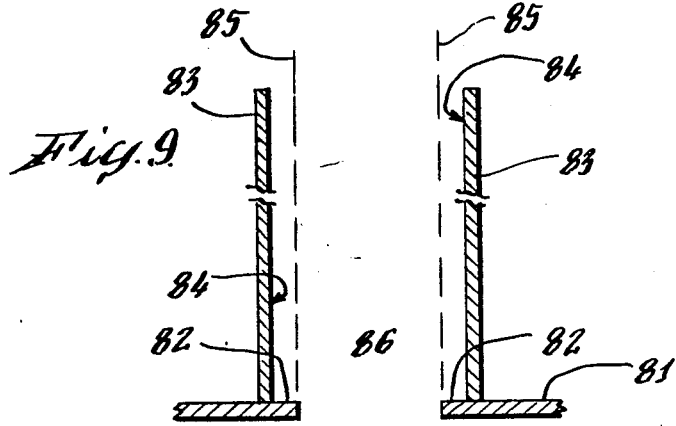

In FIG. 9, tubular structure 83 is mounted on light impervious cover 81 having perforations equal in diameter to that of light beam 86 defined by dotted lines 85 and projected upwardly from the light chamber below sheet 81. The holes or perforations in sheet 81 have a diameter smaller than that of tubular structure 83. The difference in the diameter of structure 83 and of light beam 86 is accounted for by the setbacks 82, these setbacks conversely being protrusions or lips in sheet 81 determining the diameter of light beam 86. Any remaining amount of light striking the inner walls of structure 83 is absorbed by the non-reflective coating 84.

While the schematic drawings referred to illustrate the principle of restricting the size of a light beam in order to prevent reflected glow as well as direct glare, some small portion of the light projected upwardly from the light chamber will shine upwardly at an angle and may in some instances reach the inner walls of the hollow vertical structures. To avoid such occurrences, it is desirable to raise the position of the baffle or light restrictive means above the cover of the light chamber, which further cuts off any unintended angles of the light beam. This approach is illustrated in FIG. 6.

Another efficaceous method of preventing slanted light rays from being reflected from the inside surfaces of the tubular structures comprises providing two or more sets of baffles within the length of the hollow vertical structure. These separate sets of baffles or restrictive means are vertically spaced from each other. An illustration of this type of system would be a combination of the light impervious coating 63 at the receiving end of the hollow structure of FIG. 7 with the light restrictive baffle means 53 spaced from the light receiving end of structure 52 of FIG. 6.

Figure 10:
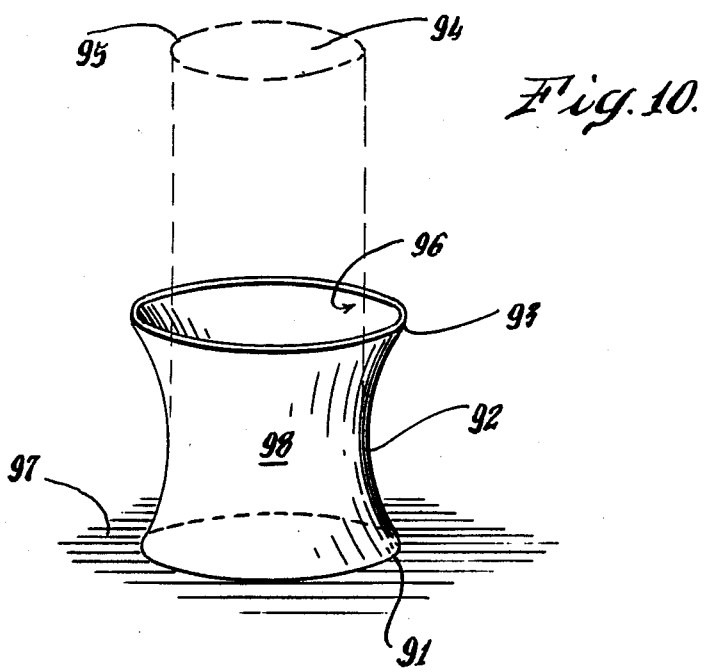
FIGS. 10 and 11 are diagrammatic perspective views of two embodiments of the hollow structures forming vertical light passageways.

FIG. 10 depicts in diagrammatic perspective view a light-conducting hollow structure 98 having lower circular, downwardly flaring portion 91, a narrow waist 92 and an upper, upwardly flaring portion 93. The rims of light-gathering portion 91 are attached to the previously described horizontal cover indicated by shading 97 positioned above the light chamber described; said cover having light-transmitting portions in register with the opening in lower portion 91. Light entering through lower portion 91 is reduced in diameter by the restriction or waist 92 to the circular light beam 94 defined by dotted line 95. The inner wall surface 96 of upper light-emitting portion 93 is covered by a black, non-reflective substance, so as to further reduce glow produced by any small amount of light reaching said upper wall of structure 98 having an hour-glass shape.

Figure 11:
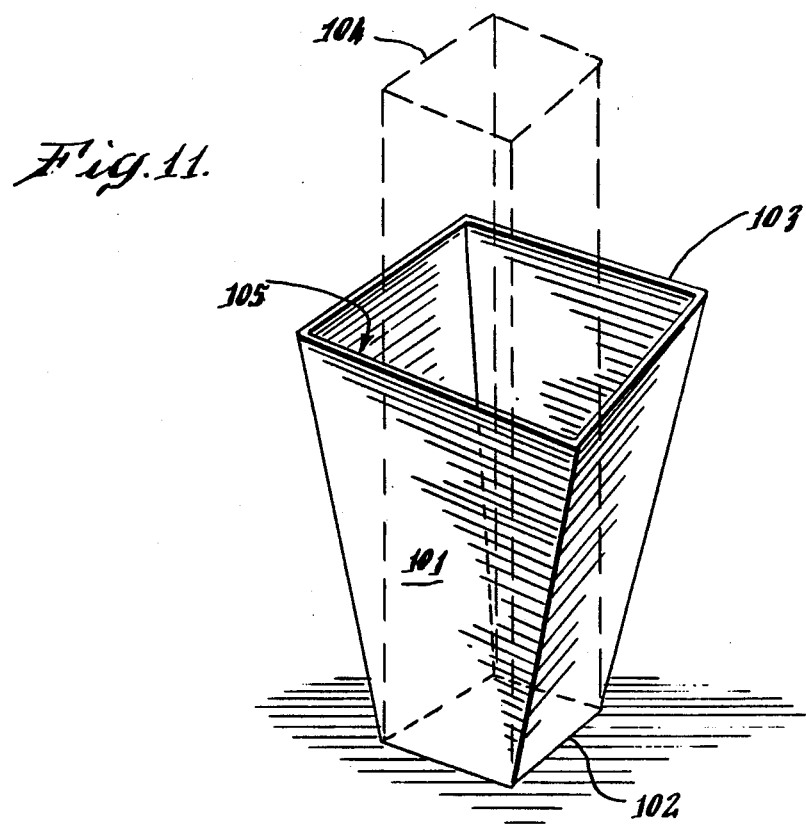

FIG. 11 is a diagrammatic perspective view of a hollow, light-conducting structure 101 having the shape of an inverted, truncated pyramid. Other shapes, such as truncated cones, may be devised. Structure 101 has lower, light-receiving end 102 and upper, light-emitting end 103. Upper end 103 has a larger cross-section than lower end 102. The walls of structure 101 normally are light-impervious and at least the upper part of the inner wall surface is coated with a light-absorbing material. The lower end 102 is mounted above a light chamber of the kind described in light-receiving relationship with the light source and the opening of lower end 102 controls the cross-section of the light passing upwardly through structure 101. The configuration of the lower opening of end 102 defines the restricted cross-section of the light beam indicated by dotted lines 104. The light entering at lower end 102 substantially does not impinge on the inner, upwardly expanding walls of structure 101 and any small amounts of such light are prevented from emerging from the opening at end 103 or made otherwise invisible by the light-absorptive nature and texture of the inner wall surfaces 105.

In an embodiment of said light-conducting structures having square or rectangular, cross-sectional configurations, a plurality of such structures are disposed in abutting relationship in which upper ends 103 form a perforate, table-like surface or panel. It is an important characteristic and advantage of the illuminating systems according to the present invention that to the eyes of all observers, except those peering directly downwardly into said structures, the exposed surfaces of the system appear dark. The light-transmitting panel described above and formed by said hollow structures presents to observers a plurality of invisible borders surrounding the areas of the upwardly projected light beams, which are equally invisible to observers until they strike surfaces of objects disposed above said hollow structures. It is another important feature of the present invention that in arranging the above described elements of the up-lighting system intended for outdoor or other uses requiring waterproof characteristics, the structures permitting the upward passage of restricted light beams are disposed above the watertight covers of the light chamber, because it has been found that positioning a transparent sheet above said light-emitting structures produces objectionable glare. It will be obvious that the short light path, which is inherent in the system will result in the maximum utilization of electric power, as scattering of light over a long light path is avoided. The length of the tubular passageways, from their light-receiving lower ends to their light-emitting upper ends is determined by the size of the three-dimensional objects to be illuminated. By providing side-by-side structures of equal heights or with co-terminal upper ends, a kind of level table surface can be created, which is capable of supporting a flower pot, vase, urn, sculpture and the like. Without a specific object placed on the apparatus for illumination, light may be projected against a reflective room ceiling for area lighting.

The hollow light conducting structures may have cross-sections which are rounded, rectangular, square, irregular and custom-designed; the light transmitting portions, or openings in the cover of the light chamber have corresponding configurations.

The cover of the light chamber may be wholly or partially transparent and it may be provided with one or more transparent, colored portions to produce a desired lighting effect as set forth herein.

For uses in which the system is not exposed to water, as for example in the display of sculptures, such cover need not be imperforate and may be a perforate plate, mesh, web or grid. If said cover is perforated and serves as a support, or if said cover is transparent throughout, a light guard is provided around the light-conducting structures. Such light guard may be an impervious wall, co-extensive with the wall of the light chamber, such as wall 14 shown in FIG. 2 and having a height which is normally at least that of the light-conducting structures.

In the event said light-conducting structures are spaced from each other, a table-like surface of the system may still be created by providing a horizontal sheet at or near the upper ends of said structures. Said sheet is impervious to light and has openings or perforations in register with the openings in the upper ends of said structures. Such a sheet serves to cover any voids between the vertical, light-conducting structures, limiting light projected upwardly from said light chamber to that passing through the restricted passageway of the hollow structures.

The embodiments of the invention described herein are intended to be illustrative of the principles of the invention and not limiting. Various modifications and other configurations and applications will occur to those skilled in the art. The scope of the present invention is indicated by the appended claims rather than by the foregoing description and all changes which come within the meaning and range of equivalency of the claims are intended to be embraced therein.

What is claimed is:

1. An illuminating system comprising
   an electric light source,
   a light chamber adapted to contain said light source, having a bottom and a light-impervious wall permitting light to escape upwardly,
   means to supply electricity to said light source,
   a cavity proximately disposed above said light chamber, forming a vertical passageway for light, including
      walls having inner non-reflective surface portions,
      a lower end in light-receiving relationship with said light chamber,
      an upper, light-emitting end pointing upwardly,
      said cavity further being provided with light blocking means in said passageway restricting the upward passage of light in such manner that the cross-section of the light beam emitted at said upper end is smaller than the cross-section of said cavity near its upper end,
      so that said restricted light beam passing through said cavity does not substantially impinge upon the inner surface of said cavity walls near their upper ends, and
   means to support said cavity walls without preventing the upward passage of light to and through said cavity,
   so that light projected upwardly by said light source passes through said cavity and is emitted at the upper end of said cavity without being directly visible to nearby observers, said light being visible only by its reflections from an illuminated object.

2. The system according to claim 1, wherein said cavity surrounds an object to be illuminated.

3. The system according to claim 2, wherein a plurality of said cavities of different horizontal dimensions surrounds said object.

4. The system according to claim 1, having a waterproof cover disposed above said light chamber, said cover having transparent portions.

5. The system according to claim 1 intended to illuminate an object, wherein said object is supported by independent means disposed central to said cavity.

6. The system according to claim 1, having a plurality of vertically spaced light-blocking means.

7. A system as in claim 1 wherein said light blocking means comprises at least two sets of vertically spaced baffles.

* * * * *